(12) United States Patent
Gupta et al.

(10) Patent No.: US 11,715,032 B2
(45) Date of Patent: Aug. 1, 2023

(54) TRAINING A MACHINE LEARNING MODEL USING A BATCH BASED ACTIVE LEARNING APPROACH

(71) Applicant: Robert Bosch GmbH, Stuttgart (DE)

(72) Inventors: Gaurav Gupta, Los Angeles, CA (US); Anit Kumar Sahu, Pittsburgh, PA (US); Wan-Yi Lin, Pittsburgh, PA (US); Joseph Christopher Szurley, Upper St. Clair, PA (US)

(73) Assignee: Robert Bosch GmbH, Stuttgart (DE)

( * ) Notice: Subject to any disclaimer, the term of this patent is extended or adjusted under 35 U.S.C. 154(b) by 459 days.

(21) Appl. No.: 16/582,928

(22) Filed: Sep. 25, 2019

(65) Prior Publication Data

US 2021/0089960 A1 Mar. 25, 2021

(51) Int. Cl.
*G06N 20/00* (2019.01)
*G06N 5/04* (2023.01)

(52) U.S. Cl.
CPC ............. *G06N 20/00* (2019.01); *G06N 5/04* (2013.01)

(58) Field of Classification Search
CPC ........ G06N 20/00; G06N 5/04; G06N 3/0472; G06N 3/08; G06K 9/6223; G06K 9/6256; G06K 9/6268
See application file for complete search history.

(56) References Cited

U.S. PATENT DOCUMENTS

| | | | |
|---|---|---|---|
| 10,719,301 B1* | 7/2020 | Dasgupta | G06F 11/3688 |
| 2008/0154848 A1* | 6/2008 | Haslam | G06F 16/382 |
| 2018/0288063 A1* | 10/2018 | Koottayi | G06N 20/00 |
| 2019/0354810 A1* | 11/2019 | Samel | G06N 3/04 |

OTHER PUBLICATIONS

Zhang J, Shen L. An improved fuzzy c-means clustering algorithm based on shadowed sets and PSO. Comput Intell Neurosci. 2014;2014:368628. doi: 10.1155/2014/368628 (Year: 2014).*

(Continued)

*Primary Examiner* — Luis A Sitiriche
(74) *Attorney, Agent, or Firm* — Michael Best & Friedrich LLP (57) ABSTRACT

A system for training a machine learning model using a batch based active learning approach. The system includes an information source and an electronic processor. The electronic processor is configured to receive a machine learning model to train, an unlabeled training data set, a labeled training data set, and an identifier of the information source. The electronic processor is also configured to select a batch of training examples from the unlabeled training data set and send, to the information source, a request for, for each training example included in the batch, a label for the training example. The electronic processor is further configured to, for each training example included in the batch, receive a label, associate the training example with the label, and add the training example to the labeled training data set. The electronic processor is also configured to train the machine learning model using the labeled training data.

20 Claims, 3 Drawing Sheets

(56) References Cited

OTHER PUBLICATIONS

Y. Shen, Y. Song, H. Li, S. Kamali, B. Wang and C. .-C. J. Kuo, "K-Covers for Active Learning in Image Classification," 2019 IEEE International Conference on Multimedia & Expo Workshops (ICMEW), 2019, pp. 288-293, doi: 10.1109/ICMEW.2019.00-72. (Year: 2019).*
T. Hofmann and J. M. Buhmann, "Pairwise data clustering by deterministic annealing," in IEEE Transactions on Pattern Analysis and Machine Intelligence, vol. 19, No. 1, pp. 1-14, Jan. 1997, doi: 10.1109/34.566806. (Year: 1997).*
Burr Settles. Active Learning Literature Survey. Computer Sciences Technical Report 1648, University of Wisconsin-Madison. 2009. (Year: 2009).*
Burr Settles. Active learning literature survey. University of Wisconsin, Madison, 52(55-66):11, 2010.
Golovin, D., and Krause, A. 2011. Adaptive submodularity: Theory and applications in active learning and stochastic optimization. JAIR.
David JC MacKay. Information-based objective functions for active data selection. Neural computation, 4(4):590-604, 1992.
Kai Wei, Rishabh K Iyer, and Jeff A Bilmes. Submodularity in data subset selection and active learning. In ICML, 2015.
Chen, Yuxin and Krause, Andreas. Near-optimal batch mode active learning and adaptive submodular optimization. In CML, pp. 160-168, 2013.
Karin Gal and Zoubin Ghahramani. Dropout as a bayesian approximation: Representing model uncertainty in deep learning. In International Conference on Machine Learning, 2016.
Karin Gal, Riashat Islam, and Zoubin Ghahramani. Deep bayesian active learning with image data. arXiv preprint arXiv:1703.02910, 2017.
Ozan Sener and Silvio Savarese. Active learning for convolutional neural networks: A core-set approach. In International Conference on Learning Representations, 2018. URL https://openreview.net/forum?id=H1aluk-RW.
Daniel Golovin, Andreas Krause, and Debajyoti Ray. Near-optimal bayesian active learning with noisy observations. In NIPS, 2010.
Yuxin Chen, S. Hamed Hassani, Amin Karbasi, and Andreas Krause. Sequential information maximization: When is greedy near-optimal? In COLT, 2015.
Ishan Jindal et al. A Nonlinear, Noise-aware, Quasi-clustering Approach to Learning Deep CNNs from Noisy Labels. In CVPR workshop 2019.
Ashish Kheta et al. Learning From Noisy Singly-Labeled Data. In ICLR 2018.
Jun Du and Charles X. Ling, Active Learning with Human-Like Noisy Oracle. In 2010 IEEE International Conference on Data Mining.

* cited by examiner

FIG. 3

TRAINING A MACHINE LEARNING MODEL USING A BATCH BASED ACTIVE LEARNING APPROACH

BACKGROUND

Machine learning models (for example, neural networks, decision trees, support vector machines, Bayesian networks, and the like) are included in many products such as automobiles, medical equipment, security systems, and the like. Machine learning models are trained to classify input data (for example, an image received from a camera, an audio recording received from a microphone, and the like) as one of a plurality of options by a learning algorithm using labeled training data. For example, a machine learning model may receive an image from a camera as input and be trained to determine whether an image includes an elephant. In this example, the training data includes a plurality of images which either do or do not depict elephants. Each image in the training data is associated with a label that indicates whether an elephant is included in the image. By attempting to determine, for each training example included in the training data, whether an elephant is depicted in the image and updating the machine learning model each time the determination is incorrect, the machine learning model learns to detect whether an image includes an elephant.

SUMMARY

Active learning is a special case of machine learning in which a learning algorithm is able to interactively query a user or some other information source (for example, a database) to obtain labels for unlabeled training data. Active learning is useful because labeling training data is a time consuming and labor intensive task. For example, in medical diagnostics, labeling MM scans, computed tomography (CT) scans, positron emission tomography (PET) scans, and the like to indicate whether the scans are indicative of a particular disease or condition is a time consuming task that requires expert medical knowledge. Learning algorithms using active learning reduce the number of labeled training examples needed to train machine learning models (for example, deep learning models) by selecting the most relevant training examples from the unlabeled training data and only querying an information source for the labels of the training examples deemed the most relevant.

Currently, there exist several systems that use active learning to train machine learning models. However, many current systems acquire one additional labeled training example at a time, add the one additional training example to the labeled training data, and re-train the model using the updated labeled training data after each acquisition. These current systems spend significant computation time on re-training the machine learning model, especially when the machine learning model is a deep learning model. These current systems are also inefficient because each query to an information source is associated with a cost (for example, processing and network capacity) and these systems make a large number of queries to the information source. Additionally, many current systems fail to take into account the fact that the information source may provide incorrectly labeled or noisy data.

To overcome the deficiencies of current systems for training machine learning models with active learning, embodiments herein describe, among other things, a system and a method for training a machine learning model using a batch based active learning approach. In some embodiments, an active learning algorithm queries an information source for the labels for a batch of training examples. After acquiring labels for a batch of training examples, the learning algorithm retrains the machine learning model using the batch of labeled training examples. Retraining the machine learning model after acquiring labels for a batch of training examples rather than retraining the machine learning model after acquiring a label for a single training example allows machine learning models to be taught using less processing power and less powerful processors. Additionally, training machine learning models using batches of training examples rather than single training examples, allows the machine learning models to be trained in less time and with fewer queries to the information source. Faster and more efficient methods for training machine learning models are especially important when the machine learning model utilizes deep learning (for example, a deep neural network).

Some embodiments described herein also take into account that labels acquired for one or more training examples may be incorrect or noisy. In some instances, embodiments include appending a layer onto the machine learning model being trained. The appended layer determines the likelihood that a trained machine learning model may mislabel the input it received due to noisy or mislabeled training data.

One embodiment provides a system for training a machine learning model using a batch based active learning approach. The system includes an information source and an electronic processor. The electronic processor is configured to receive a machine learning model to be trained, an unlabeled training data set, a labeled training data set, and an identifier of the information source. The electronic processor is also configured to select a batch of training examples from the unlabeled training data set and send, to the information source, a request for, for each training example included in the batch, a label for the training example. The electronic processor is further configured to, for each training example included in the batch, receive a label, associate the training example with the label, and add the training example to the labeled training data set. The electronic processor is also configured to train the machine learning model using the labeled training data included in the batch.

Another embodiment provides a method for training a machine learning model using a batch based active learning approach. The method includes receiving a machine learning model to be trained, an unlabeled training data set, a labeled training data set, and an identifier of an information source. The method also includes selecting, with an electronic processor, a batch of training examples from the unlabeled training data set and sending, to the information source, a request for, for each training example included in the batch, a label for the training example. The method further includes, for each training example included in the batch, receiving a label, associating the training example with the label, and adding the training example to the labeled training data set. The method also includes training, with the electronic processor, the machine learning model using the labeled training data included in the batch.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
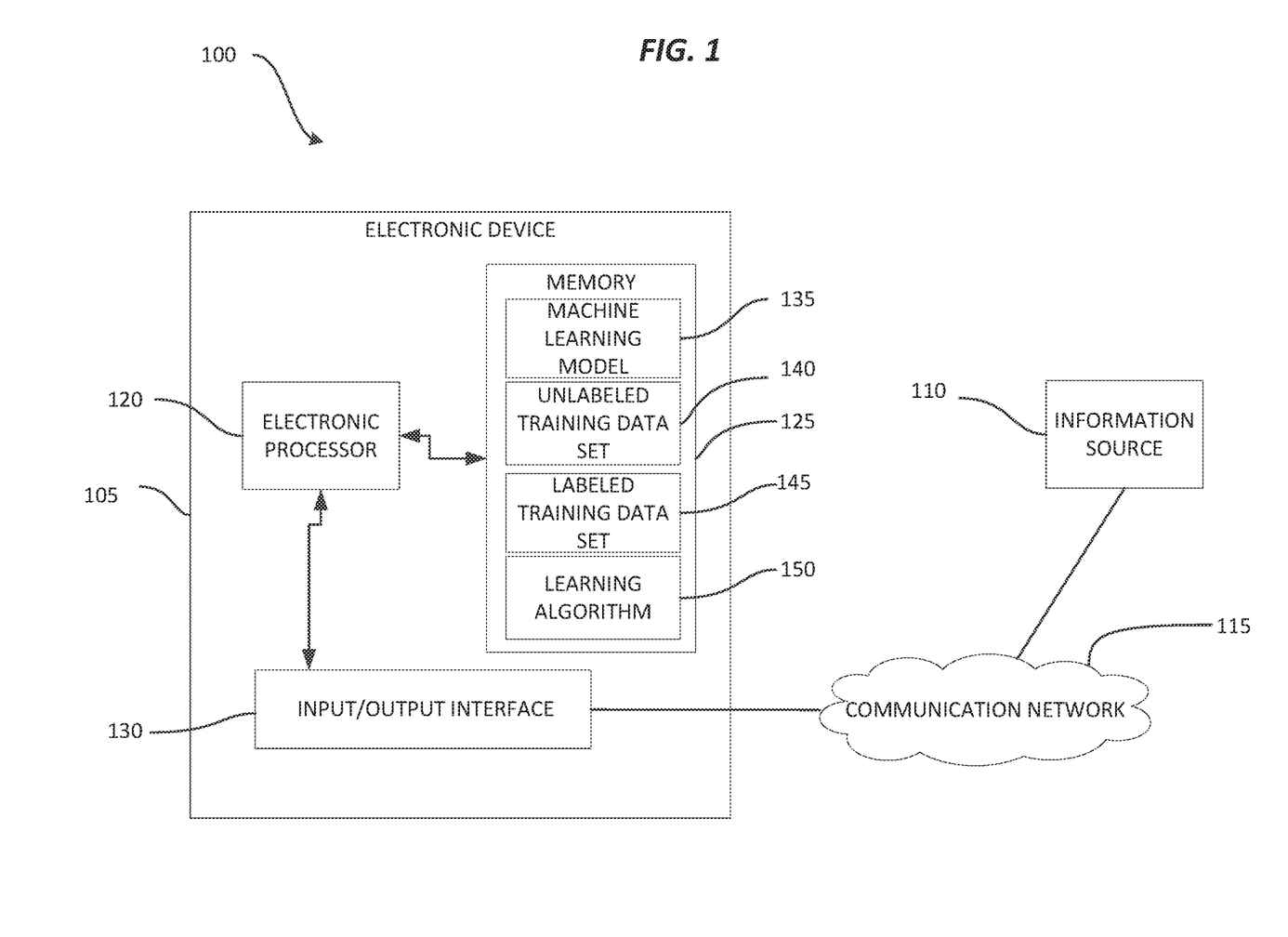
FIG. 1 is a block diagram of a system for training a machine learning model using a batch based active learning approach according to some embodiments.

FIG. 1 illustrates a system 100 for training a machine learning model using a batch based active learning approach. The system 100 includes an electronic device 105 and an information source 110. The electronic device 105 may be a laptop or desktop computer, a tablet computer, smart phone, or other computing device. The information source 110 may be a laptop or desktop computer, a tablet computer, smart phone, database, or other computing device. In some embodiments, the information source 110 is a desktop computer that outputs an auditory or visual training example to a user and receives from the user a label for the training example. For example, the information source 110 may include a screen that displays CT scans and an input device that allow an electronic processor of the information source 110 to receive, from a radiologist, a selection of whether the CT scan indicates that a patient has cancer.

As illustrated in FIG. 1, the electronic device 105 and information source 110 communicate over a communication network 115. The communication network 115 includes one or more wired networks, wireless networks, or a combination thereof that enable communications within the system 100. For example, in some configurations, the communication network 115 includes cable networks, the Internet, local area networks (LANs), wide area networks (WAN), mobile telephone networks (MTNs), and other types of networks, possibly used in conjunction with one another, to facilitate communication between the electronic device 105 and information source 110 included in the system 100.

The embodiment illustrated in FIG. 1 provides but one example of the components and connections of the system 100. However, these components and connections may be constructed in other ways than those illustrated and described herein.

The electronic device 105 includes a plurality of electrical and electronic components that provide power, operation control, and protection to the components and modules within the electronic device 105. The electronic device 105 includes, among other things, an electronic processor 120 (such as a programmable electronic microprocessor, microcontroller, or similar device), a memory 125 (for example, non-transitory, computer readable memory), and an input/output interface 130. The electronic processor 120 is communicatively connected to the memory 125 and the input/output interface 130. The electronic processor 120, in coordination with the memory 125 and the input/output interface 130, is configured to implement, among other things, the methods described herein. It should be understood that the electronic device 105 may also include one or more sensors that capture data that may be input to a machine learning model for classification as one of a plurality of classes. For example, the electronic device 105 may include a camera, radar sensor, lidar sensor, ultrasonic sensor, microphone, a combination of the foregoing, or the like.

As will be described in further detail below, the memory 125 includes computer executable instructions for training a machine learning model using a batch based active learning approach. In the example illustrated in FIG. 1, the memory 125 includes a machine learning model 135, an unlabeled training data set 140, a labeled training data set 145, and a learning algorithm 150, each of which are described in further detail below. It should be understood that the memory 125 may include more, fewer, or different programs or software components than those illustrated in FIG. 1. It should also be understood that functionality or values described herein as being associated with one component of the memory 125 may, in other embodiments, be associated with a different component of the memory 125.

In some embodiments, the electronic device 105 may be implemented in several independent controllers (for example, programmable electronic controllers) each configured to perform specific functions or sub-functions. Additionally, the electronic device 105 may contain sub-modules that include additional electronic processors, memory, or application specific integrated circuits (ASICs) for handling input/output functions, processing of signals, and application of the methods listed below. In other embodiments, the electronic device 105 includes additional, fewer, or different components. Thus, the programs may also be distributed among one or more processors.

Figure 2:
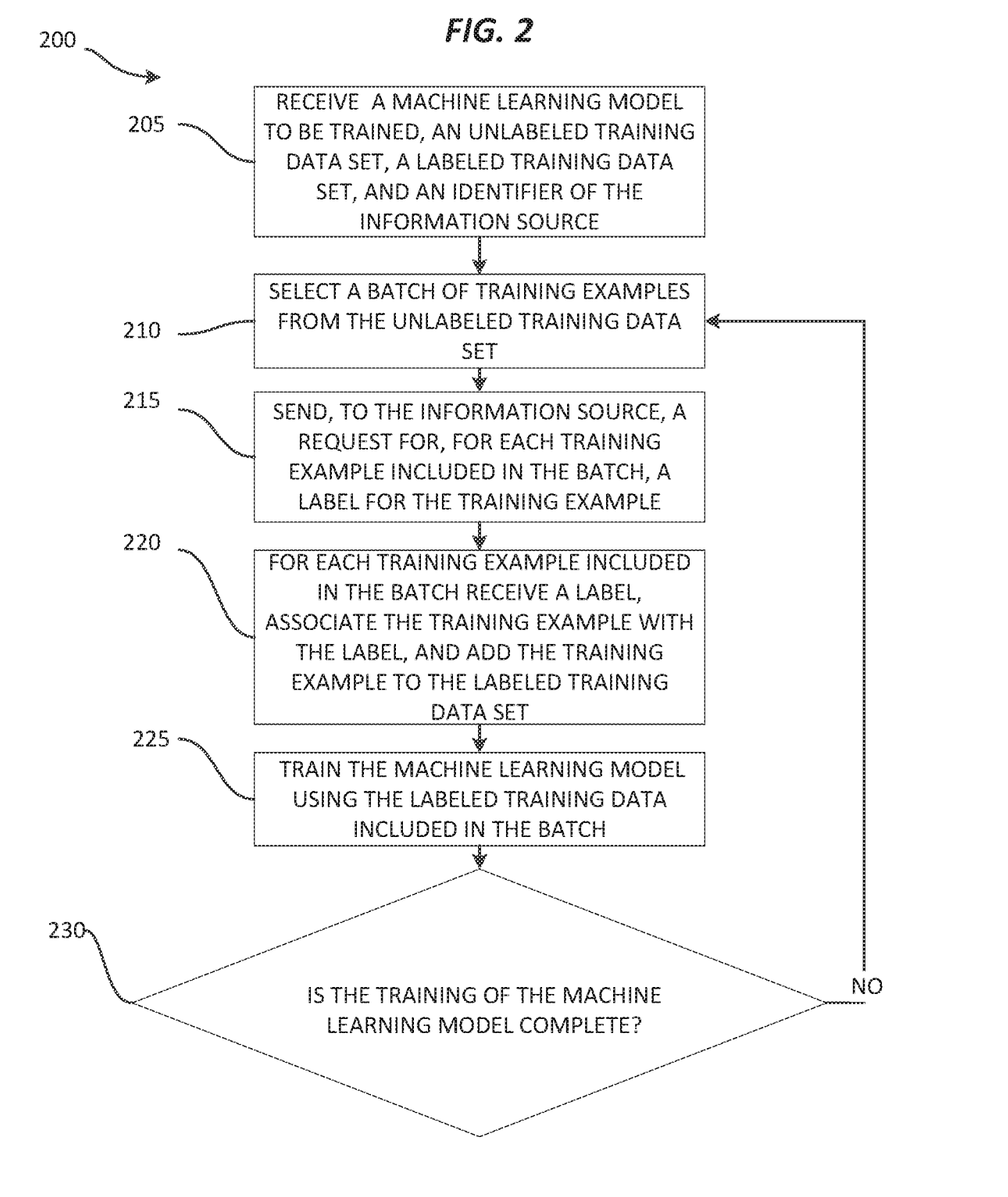
FIG. 2 is a flowchart of a method for using the system of FIG. 1 to train a machine learning model using a batch based active learning approach according to some embodiments.

FIG. 2 illustrates an example of a method 200 for training a machine learning model using a batch based active learning approach. The method 200 is performed by the electronic processor 120 when the electronic processor 120 executes the learning algorithm 150.

The method 200 begins at step 205 when the electronic processor 120 receives a labeled training data set (for example, labeled training data set 145), an unlabeled training data set (for example, the unlabeled training data set 140), a machine learning model to train (for example, the machine learning model 135), and an identifier of an information source to query to obtain labels for the unlabeled training data set 140 (for example, the information source 110). The machine learning model 135 may be for example, a neural network, a decision tree, a support vector machine, a Bayesian network, or the like. The labeled training data set 145 and the unlabeled training data set 140 are, for example, a pool of images, voice recordings, or the like. The size of the received labeled training data set 145 is usually very small as compared to the size of the unlabeled training data set 140 but both training data sets contain training data of the same medium. For example, if the unlabeled training data set 140 includes images then the labeled training data set 145 will also include images. As described in further detail below, the labeled training data set 145 and the unlabeled training data set 140 vary as the method 200 is performed. It should be noted that, in some embodiments, when the labeled training data set 145 set is received it includes a small number of labeled training examples and on the first iteration of the method 200, the electronic processor 120 trains the machine learning model 135 with the small number of training examples included in the received labeled training data set 145 before performing step 210.

Figure 3:
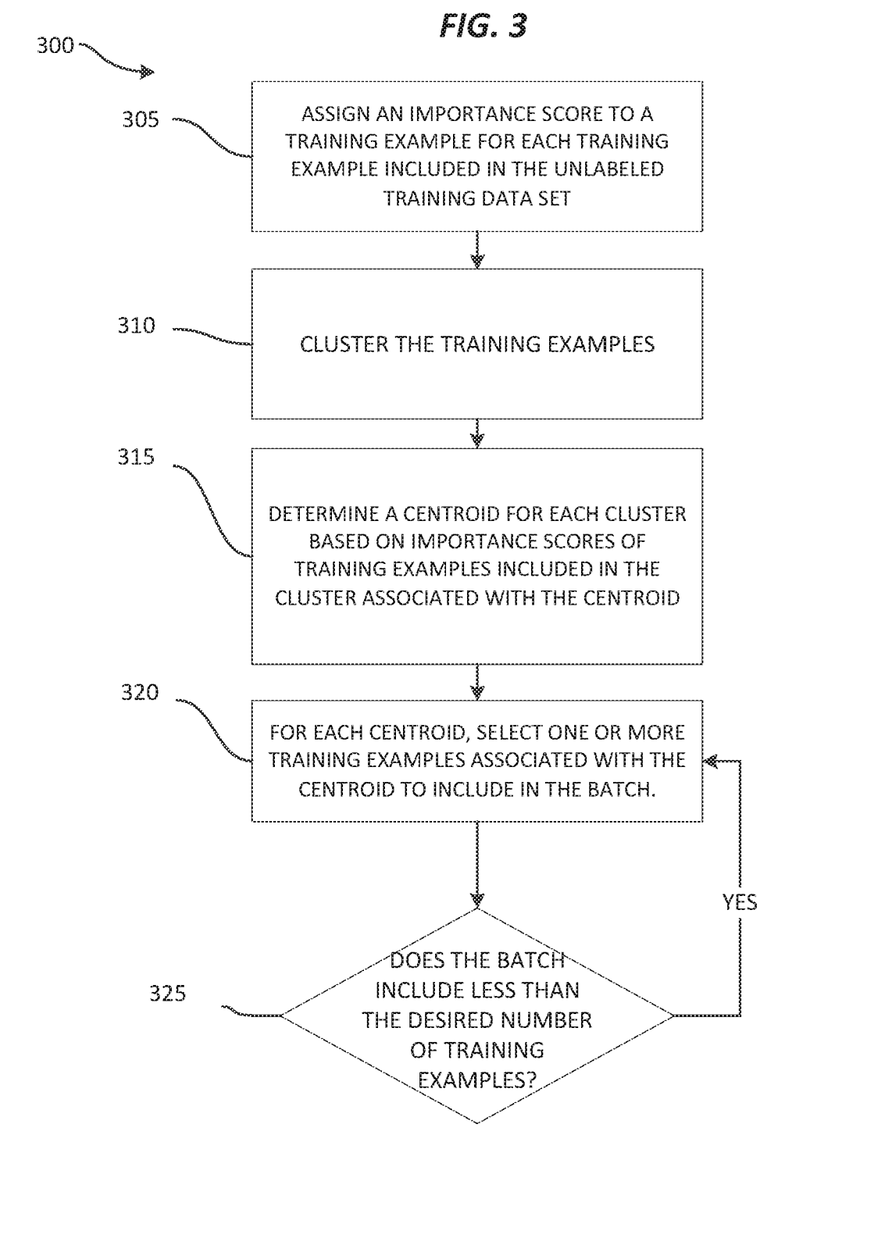
FIG. 3 is a flowchart of a method for using the system of FIG. 1 to select training examples from an unlabeled training data set for inclusion in a batch of training examples according to some embodiments.

At step 210, the electronic processor 120 selects a batch of training examples from the unlabeled training data set 140. FIG. 3 illustrates an example method 300 performed by the electronic processor 120 to select training examples from the unlabeled training data set 140 to include in the batch. At step 305, the electronic processor 120 assigns an importance score to each unlabeled training example included in the unlabeled training data set 140. For example, the importance score is determined for an unlabeled training example based on mutual information between a vector of model parameters ($\Theta$) of the machine learning model 135 and the training example (x). The following equation (1) is used to calculate mutual information. The following equation (1) describes the mutual importance between two random variables X and Y (I(X;Y)).

$$I(X; Y) = \Sigma p(x, y) \log\left(\frac{p(x)p(y)}{p(x, y)}\right), \quad (1)$$

In the equation (1) p(x, y) is the joint distribution of the random variables X and Y. Further information regarding determining mutual importance can be found at https://en.wikipedia.org/wiki/Mutual_information. The importance score assigned to a training example (x) is indicative of the reduction in the uncertainty of the machine learning model 135 when the machine learning model 135 is trained using the training example (x).

After an importance score has been assigned to each training example included in the unlabeled training data set 140, the electronic processor 120, at step 310, clusters similar unlabeled training examples together. The electronic processor 120 performs the clustering by executing a clustering algorithm, such as a k-means clustering algorithm. In some embodiments, the desired number of clusters (k) is determined based on a desired number of training examples to include in a batch (a desired batch size). The desired batch size may be a predetermined value of may be selected prior to the execution of the method 200. In some embodiments, for each training example included in the unlabeled training data set 140, output of a the machine learning model 135 when the machine learning model 135 is given the unlabeled training example is run through a squashing function (for example, the softmax function) and then used to cluster the training examples included in the unlabeled training data set 140. For example, if the machine learning model 135 is classifying input as belonging to one of K classes, the training example is represented as ŷ, where ŷ is K-dimensional output of the of the machine learning model 135 (given the training example as input) after it is put through the squashing function. In some embodiments, the square root of the Jenson-Shannon divergence is used as the distance metric of the clustering algorithm and the clustering is performed with a bottom-up approach (also known as Agglomerative Clustering) until the desired number of clusters are attained. The Jenson-Shannon divergence measures closeness of two probability distributions.

At step 315, the electronic processor 120 determines a centroid for each cluster based on importance scores of training examples included in the cluster associated with the centroid. For example, the centroid of the cluster may have an importance score that is the median of the importance scores of the training examples included in the cluster.

At step 320, the electronic processor 120 selects, for each centroid, one or more unlabeled training examples associated with the centroid to include in the batch. In some embodiments, the following Gibbs distribution (equation (2)) is used to select one or more unlabeled training examples relative to the centroid for inclusion in the batch.

$$P_{ic} \sim \text{Categorical}\left(\frac{e^{-\beta d_{1c}}}{\Sigma e^{-\beta d_{1c'}}}, \frac{e^{-\beta d_{2c}}}{\Sigma e^{-\beta d_{2c'}}}, \ldots, \frac{e^{-\beta d_{Nc}}}{\Sigma e^{-\beta d_{Nc'}}}\right) \quad (2)$$

$P_{ic}$ is the probability that an unlabeled training example is associated with the centroid. In some embodiments, unlabeled training examples with a $P_{ic}$ value greater than a predetermined threshold (for example, 75 percent) are included in the batch. In some embodiments, unlabeled training examples with a $P_{ic}$ greater than a first predetermined threshold (for example, 65 percent) and less than a second predetermined threshold (for example, 75 percent) are included in the batch. In some embodiments, unlabeled training examples with a $P_{ic}$ greater than or equal to a first predetermined threshold and less than or equal to a second predetermined threshold are included in the batch. In some embodiments, the electronic processor 120 is configured to modify the first predetermined threshold and second predetermined threshold at block 325, so that more training examples are added to the batch if step 320 is repeated.

In equation (2) $\beta$ is the inverse temperature coefficient and a function of the uncertainty of the machine learning model 135 (described in further detail below), $d_{ij}$ denotes square root of Jenson-Shannon distance between the centroid of a cluster and an unlabeled training example included in the cluster. $\beta$ ranges from 0 to $\infty$ where the value of 0 indicates an uncertain machine learning model 135, and $\infty$ indicates a certain machine learning model 135.

When training of the machine learning model 135 begins (for example, in the first iteration of the method 200) the machine learning model 135 is uncertain and its predictions (output) are very unreliable. As the number of times the electronic processor 120 preforms steps 210 to 225 of the method 200 (described below) increases the machine learning model 135 becomes stronger and makes progressively more certain predictions regarding the classification of input. The uncertainty of the machine learning model 135 is measured as a function of the variance of the output of the machine learning model 135, variation ratio of the output of the machine learning model 135, or the like. Since the importance score is dependent on the certainty of the output of the machine learning model 135, the importance scores are not accurate when the machine learning model 135 is uncertain.

To account for the changing accuracy of the importance scores, the electronic processor 120 uses equation (2) to determine the unlabeled training examples to include in the batch in a somewhat random fashion. In conventional deterministic annealing, the association of points to clusters is weak when the temperature coefficient is high, and the association of points to clusters becomes stronger as the temperature coefficient decreases. In some embodiments described herein, as stated above, β (the temperature coefficient) is taken to be the inverse of the uncertainty of the machine learning model 135. For example, when the machine learning model 135 is highly uncertain, β is low.

The inverse function used by the electronic processor 120 to determine from the uncertainty of the machine learning model 135 may depend on the machine learning model 135 (for example, whether the machine learning model 135 is a neural network or a decision tree) as well as the type of training data included in the labeled and unlabeled training data sets (145, 140) (for example, whether the training data includes images or audio recordings). In some embodiments, cross-validation is used to determine the inverse function from fixed classes of functions. In one example, log $$\frac{1}{\sigma}$$

(where σ is the quantified model uncertainty and the base of the logarithm is e) may be used as the inverse function. In another example, $$e^{\frac{1}{\sigma}}$$

(where σ is the quantified model uncertainty) may be used as the inverse function.

At step 325, the electronic processor 120 determines if the batch includes the desired number of unlabeled training examples or batch size. If the number of unlabeled training examples included in the batch is less than the desired batch size, the electronic processor 120 repeats steps (acts) 320 and 325 of the method 300.

Returning to the method 200, at step 215 the electronic processor 120 sends, to the information source 110, a request for, for each training example included in the batch determined in step 210, a label for the training example. At step 220, the electronic processor 120 receives, for each training example included in the batch, a label and associates the training example with the label. Once a training example is associated with a label, the electronic processor 120 removes the training example from the unlabeled training data set 140 and adds the training example to the labeled training data set 145. At step 225, the electronic processor 120 retrains the machine learning model 135 using the labeled training data set 145 that has been updated to include the training examples selected for inclusion in the batch at step 210. At step 230, the electronic processor 120 determines whether the training of the machine learning model 135 is complete. In some embodiments, the electronic processor 120 determines that the training of the machine learning model 135 is complete when the machine learning model 135 achieves a desired failure rate or desired success rate. In other embodiments, the electronic processor 120 determines that the training of the machine learning model 135 is complete when at least a predetermined number of requests or queries for labels have been sent to the information source 110 or at least a predetermined amount of processing power has been used to query the information source 110. If training that machine learning model 135 is not complete the electronic processor 120 repeats steps (acts) 210 to 230.

Once the machine learning model 135 is trained, the machine learning model 135 may classify received input data. In one example, the machine learning model 135 may receive a CT scan from one or more x-ray detectors as input and classify the CT scan as being indicative of cancer or not being indicative of cancer. In another example, the machine learning model 135 may receive images and audio recordings of a factory floor from a camera and microphone respectively and classify the images and audio recordings as being indicative of an issue (for example, machine malfunction) or not being indicative of an issue. In some embodiments, the machine learning model 135 may also output a classification of the issue (for example, whether the issue is a worn out belt, a faulty motor, or the like).

In some embodiments, the output of the machine learning model 135 may cause the electronic processor 120 to perform an action. In one example, the machine learning model 135 may receive an image of a surrounding environment of a vehicle from a camera and determine whether there is an object (for example, a pedestrian) in the path of the vehicle. If the machine learning model 135 determines there is a pedestrian in the path of the vehicle, the electronic processor 120 may activate the brakes of the vehicle. In another example, the machine learning model 135 may receive an image of a person's face from a camera and classify the face as belonging to one of a plurality of authorized users or an unauthorized user. In response to the machine learning model 135 determining that the face in the image belongs to a person who is authorized to access the electronic device 105, the electronic processor 120 unlocks (allows a user access to) the electronic device 105. In yet another example, when the machine learning model 135 determines images and audio recordings of a factory floor are indicative of an issue as described above, the electronic processor 120 is configured to output an alert to a user (such as maintenance personnel) via an output device.

If the electronic processor 120 receives one or more incorrect labels for one or more of the training examples used to train the machine learning model 135, the machine learning model 135 may incorrectly classify the input it receives. To address this, in some embodiments, a denoising layer is appended to the machine learning model 135 (for example, when the machine learning model 135 is a neural network). The denoising layer outputs the noise associated with a training example. In other words, the denoising layer outputs the likelihood that the machine learning model 135 would output a noisy label for or incorrectly classify a training example. This likelihood can be represented as the conditional probability $p(y'|y)$, where y' is the incorrect label (the noisy label received from the information source 110) and y is the correct label (the label that would have been received from an ideal information source and, in some embodiments, the label that is output by the layer of the machine learning model 135 immediately before the denoising layer). For example, if the machine learning model 135, is classifying a handwritten digit as a 0, 1, or 2 and the correct classification is 1, the denoising layer outputs the likelihood that the machine learning model 135 classifies the handwritten digit as a 0 instead of a 1 and the likelihood that the machine learning model 135 classifies the handwritten digit as a 2 instead of a 1. The machine learning model 135 learns $p(y'|y)$ from the noisy data from the information source 110. The machine learning model 135 is trained using the output of the denoising layer (the final layer) of the machine learning model 135 because the training labels may be noisy, while the machine learning model 135 is validated using the output from the penultimate layer (assuming the labels for the validation data are noise-free). The denoising layer is a fully connected K×K dense layer, where K is the number of classes the input could possibly be classified as. The weights of the denoising layer are such that the output of the denoising layer is always positive and the sum of the output is equal to 1 ($\Sigma_{y'} p(y'|y)=1$. (3)).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

What is claimed is:

1. A system for training a machine learning model using a batch based active learning approach, the system comprising:
    an information source; and
    an electronic processor, the electronic processor configured to
        (i) receive a machine learning model to be trained, an unlabeled training data set, a labeled training data set, and an identifier of the information source;
        (ii) cluster training examples of the unlabeled training data set based on assigned importance scores, wherein the importance scores are based on mutual information between a vector of model parameters of the machine learning model and the training examples;
        (iii) select a training example for a batch of training examples from the cluster of training examples of the unlabeled training data set based on a probability that the training example is associated with a centroid of the cluster;
        (iv) send, to the information source, a request for, for each training example included in the batch, a label;
        (v) for each training example included in the batch
            receive a label,
            associate the training example with the label, and
            add the training example to the labeled training data set; and
        (vi) train the machine learning model using the labeled training data included in the batch.

2. The system according to claim 1, wherein the electronic processor is configured to repeat acts (iii)-(vi) until training of the machine learning model is complete.

3. The system according to claim 2, wherein the training of the machine learning model is complete when at least one condition is met from the group consisting of: the machine learning model achieves a desired success rate, the machine learning model achieves a desired failure rate, the electronic processor has sent at least a predetermined number of requests for labels to the information source, and at least a predetermined amount of processing power is used to query the information source.

4. The system according to claim 1, wherein the electronic processor is configured to select a batch of training examples from the unlabeled training data set by
    (vii) assigning an importance score to a training example for each training example included in the unlabeled training data set;
    (viii) clustering the training examples based on an output of a squashing function of the training examples, wherein an input of the squashing function is an output of each of the training examples input into the machine learning model;
    (ix) determining a centroid for each cluster based on the importance scores of training examples included in the cluster associated with the centroid;
    (x) for each centroid, selecting one or more training examples associated with the centroid to include in the batch, wherein the probability $P_{ic}$ is determined using the following formula:

$$P_{ic} \sim \text{Categorical}\left(\frac{e^{-\beta d_{1c}}}{\sum_{c'} e^{-\beta d_{1c'}}}, \frac{e^{-\beta d_{2c}}}{\sum_{c'} e^{-\beta d_{2c'}}}, \ldots, \frac{e^{-\beta d_{Nc}}}{\sum_{c'} e^{-\beta d_{Nc'}}}\right).$$

5. The system according to claim 4, wherein the electronic processor is configured to
    repeat act (x) until a desired number of training examples are included in the batch; and
    each time act (x) is repeated modify a predetermined threshold for selecting one or more training examples to include in a batch.

6. The system according to claim 4, wherein the importance score of a training example is indicative of reduction in uncertainty of the machine learning model when the machine learning model is trained using the training example.

7. The system according to claim 4, wherein the electronic processor is configured to
- determine an uncertainty of the machine learning model;
- use a Gibbs distribution with a temperature coefficient that is the inverse of the uncertainty of the machine learning model to determine a probability that a training example is associated with a centroid; and
- when the probability that the training example is associated with the centroid is greater than a predetermined threshold include the training example in the batch.

8. The system according to claim 4, wherein an importance score of a centroid of a cluster is a median of each of the training examples included in the cluster.

9. The system according to claim 1, wherein the electronic processor is further configured to
- when training of the machine learning model is complete, input an image or an audio recording to the machine learning model for classification into one of a plurality of classes, and
- based on the classification of the image perform one selected from the group consisting of: control an action of a vehicle, allow access to an electronic device, and output an alert to a user.

10. The system according to claim 1, wherein the electronic processor is further configured to append a denoising layer onto the machine learning model, wherein the denoising layer determines noise associated with a training example and the machine learning model is trained using output from the denoising layer.

11. A method for training a machine learning model using a batch based active learning approach, the method comprising:
- (i) receiving a machine learning model to be trained, an unlabeled training data set, a labeled training data set, and an identifier of an information source;
- (ii) clustering training examples of the unlabeled training data set based on assigned importance scores, wherein the importance scores are based on mutual information between a vector of model parameters of the machine learning model and the training examples;
- (iii) selecting, with an electronic processor, a training example for a batch of training examples from the cluster of training examples of the unlabeled training data set based on a probability that the training example is associated with a centroid of the cluster;
- (iv) sending, to the information source, a request for, for each training example included in the batch, a label for the training example;
- (v) for each training example included in the batch receiving a label,
  - associating the training example with the label, and
  - adding the training example to the labeled training data set; and
- (vi) training, with the electronic processor, the machine learning model using the labeled training data included in the batch.

12. The method according to claim 11, wherein the method includes repeating steps (iii)-(vi) until training of the machine learning model is complete.

13. The method according to claim 12, wherein the training of the machine learning model is complete when at least one condition is met from the group consisting of: the machine learning model achieves a desired success rate, the machine learning model achieves a desired failure rate, the electronic processor has sent at least a predetermined number of requests for labels to the information source, and at least a predetermined amount of processing power is used to query the information source.

14. The method according to claim 11, wherein the method includes selecting a batch of training examples from the unlabeled training data set by
- (vii) assigning an importance score to a training example for each training example included in the unlabeled training data set;
- (viii) clustering the training examples based on an output of a squashing function of the training examples, wherein an input of the squashing function is an output of each of the training examples input into the machine learning model;
- (ix) determining a centroid for each cluster based on the importance scores of training examples included in the cluster associated with the centroid;
- (x) for each centroid, selecting one or more training examples associated with the centroid to include in the batch, wherein the probability $P_{ic}$ is determined using the following formula:

$$P_{ic} \sim \text{Categorical}\left(\frac{e^{-\beta d_{1c}}}{\sum_{e} e^{-\beta d_{1c'}}}, \frac{e^{-\beta d_{2c}}}{\sum_{e} e^{-\beta d_{2c'}}}, \ldots, \frac{e^{-\beta d_{Nc}}}{\sum_{e} e^{-\beta d_{Nc'}}}\right).$$

15. The method according to claim 14, wherein step (x) is repeated until a desired number of training examples are included in the batch and each time step (x) is repeated a predetermined threshold for selecting one or more training examples to include in a batch is modified.

16. The method according to claim 14, wherein the importance score of a training example is indicative of reduction in uncertainty of the machine learning model when the machine learning model is trained using the training example.

17. The method according to claim 14, the method further comprising
- determining an uncertainty of the machine learning model;
- using a Gibbs distribution with a temperature coefficient that is the inverse of the uncertainty of the machine learning model to determine a probability that a training example is associated with a centroid; and
- when the probability that the training example is associated with the centroid is greater than a predetermined threshold including the training example in the batch.

18. The method according to claim 14, wherein an importance score of a centroid of a cluster is a median of each of the training examples included in the cluster.

19. The method according to claim 11, the method further comprising
- when training of the machine learning model is complete, inputting an image or an audio recording to the machine learning model for classification into one of a plurality of classes, and
- based on the classification of the image performing one selected from the group consisting of: control an action of a vehicle, allow access to an electronic device, and output an alert to a user.

20. The method according to claim 11, wherein the method further comprising appending a denoising layer onto the machine learning model, wherein the denoising layer determines noise associated with a training example and the machine learning model is trained using output from the denoising layer.

\* \* \* \* \*